Jan. 27, 1959 S. NAPOLIN 2,871,345

ULTRA HIGH FREQUENCY TUNERS OR CONVERTERS

Filed March 25, 1953 4 Sheets-Sheet 1

INVENTOR.

BY

ATTORNEY

Jan. 27, 1959 S. NAPOLIN 2,871,345

ULTRA HIGH FREQUENCY TUNERS OR CONVERTERS

Filed March 25, 1953

4 Sheets-Sheet 2

INVENTOR.

BY

ATTORNEY

Jan. 27, 1959

S. NAPOLIN 2,871,345

ULTRA HIGH FREQUENCY TUNERS OR CONVERTERS

Filed March 25, 1953

4 Sheets-Sheet 3

INVENTOR.
Seymour Napolin
BY
David Moses
his ATTORNEY

INVENTOR.
Seymour Napolin
BY
Day & Young
his ATTORNEY

United States Patent Office 2,871,345

Patented Jan. 27, 1959

2,871,345

ULTRA HIGH FREQUENCY TUNERS OR CONVERTERS

Seymour Napolin, Williston Park, N. Y., assignor to Radio Receptor Company, Inc., Brooklyn, N. Y., a corporation of New York Application March 25, 1953, Serial No. 344,639

2 Claims. (Cl. 250—20)

This invention relates to television "front ends," more particularly, to a novel U. H. F. tuner or converter for receiving signals in the 470–890 megacycle range and to novel co-axial cavity tuning units incorporated in a front end for television receivers.

Most television receivers presently in use are designed to receive signals in the V. H. F. range, as present telecasting is limited to some 12 channels in this range. Recently, channels in the U. H. F. range have been opened for telecasting, this range providing a greatly increased number of available channels. To receive signals in the U. H. F. range, receivers designed for reception only in the V. H. F. range must be provided with suitable converters or adaptors.

This is required because the design considerations for U. H. F. reception differ greatly from those for V. H. F. reception. For example, the skirt selectivity requirements at U. H. F. are more severe than those at V. H. F., due to the relatively close spacings of signal and image frequencies and the multiple spurious responses resulting from double conversion. This requires design of receivers with high selectivity, low antenna back radiation, good shielding, high oscillator stability with low frequency drift, high signal-to-noise ratio, and high rejection of intermediate frequency (I. F.) and other spurious interference.

While meeting these requirements to as great an extent as possible requires compromise in design due to mutually conflicting factors, it necessitates elimination from consideration of the usual V. H. F. tuning arrangements. For example, wiping contact types of tuners are unsatisfactory in U. H. F. work as the wear on the contacts tends to have an electrical significance which, while tolerable at V. H. F., can not be tolerated at U. H. F.

In accordance with the present invention, the foregoing requirements for satisfactory U. H. F. reception are met by providing a television tuner or "front end," which may also be a U. H. F. converter for present V. H. F. receivers, in which the basic tuning element is a coaxial resonant cavity having no wiping contacts and providing a thoroughly shielded unit for its associated tuning section, and which is of simple, rugged mechanical construction.

More specifically, the individual tuning element is a modified coaxial line section shorted at both ends and center loaded by lumped capacitance to attain the necessary electrical length within minimum practical dimensions. Tuning is effected by a metallic slug or plunger travelling axially of the cavity within a low loss dielectric sleeve having capacitor "collars" thereon, the movement of the plunger varying the value of the center loading capacity. The plunger serves only as a transfer or electronic coupling medium, and has no physical contact with either the cavity or the capacitor collars.

The individual tuning elements are ganged together to form the tuner, the connections to the cavities being made by suitably formed loops coupling in and out of the cavity field with the percentage of coupling being controlled by physical dimensions and placement. Movement of the ganged slugs is effected by a pivotally mounted frame operated by a simple cam to provide substantially linear frequency calibration.

The plungers or slugs are connected to the movable frame by flexible, adjustable length elements providing one initial adjustment for the tuning elements. Additional adjustments are provided by trimming the loading capacitance and by mechanically changing the electrical length of the resonant cavity. By fastening the tuning capacitor in a metal cylinder so that the collars have metallic contact with the ends of the cylinder, the container itself becomes the inductance of the tuned circuit and the sealed unit becomes the resonant coaxial cavity. A metal reed is located within the cavity and, when rotated about its longitudinal centerline, acts as a shorted turn coupling in and out of the electric field and thus functioning as a padder for the inductance.

In forming the tuner, an antenna cavity, a mixer cavity, and an oscillator cavity are interconnected electrically with their tuning slugs ganged. The antenna unit comprises the basic resonant cavity with means for coupling the antenna signal into the tuned circuit. Similarly, the mixer unit is a basic cavity with means provided to couple signals into and out of the tuned circuit.

The local oscillator unit is a modified basic cavity, with a triode socket mounted in the side wall of the container and having its plate and grid pins connected directly to the plate and grid condenser sleeves which are mounted on a dielectric sleeve fitting over the tuning capacitor collars, and cooperable with the latter. The filament leads and the grid and plate resistors are all assembled to the tuning capacitance before the latter is mounted in the casing.

A narrow slot is cut in the perimeter of the oscillator casing, causing the point in the casing above the slot to become an impedance tap point for oscillator injection to the mixer. A small capacitor and crystal holder assembly is mounted at this point. The mounting for this assembly serves a dual function, acting also as the coupling link to the mixer assembly.

The selection of the best intermediate frequency (I. F.) for the invention unit, when used as a converter, involves several considerations. If a high V. H. F. channel is selected as the I. F., improved U. H. F. image ratios and reduced oscillator radiation are possible. However, with this selection, there is lower gain, a poorer noise ratio, and decreased I. F. rejection. In addition, there are numerous additional spurious responses due to lower order harmonics of both the V. H. F. and U. H. F. oscillators.

Considering the foregoing, the invention converter unit utilizes V. H. F. channels 5 and 6 as an I. F. While it is possible to receive weak transmissions on both these channels in scattered geographical areas, the high I. F. attenuation through the tuner provides interference-free U. H. F. reception. By providing an output tuned circuit sufficiently broad to pass both these channels, only a slight readjustment of oscillator frequency is necessary to shift the response frequency in the presence of strong local signals on either of these channels. The converter is provided with a ganged switch arrangement whereby it may be selectively cut into or out of circuit with a V. H. F. receiver, dependent upon whether V. H. F. or U. H. F. reception is desired.

For an understanding of the invention principles, reference is made to the following description of a typical embodiment thereof as illustrated in the accompanying drawings. In the drawings.

Figure 9:
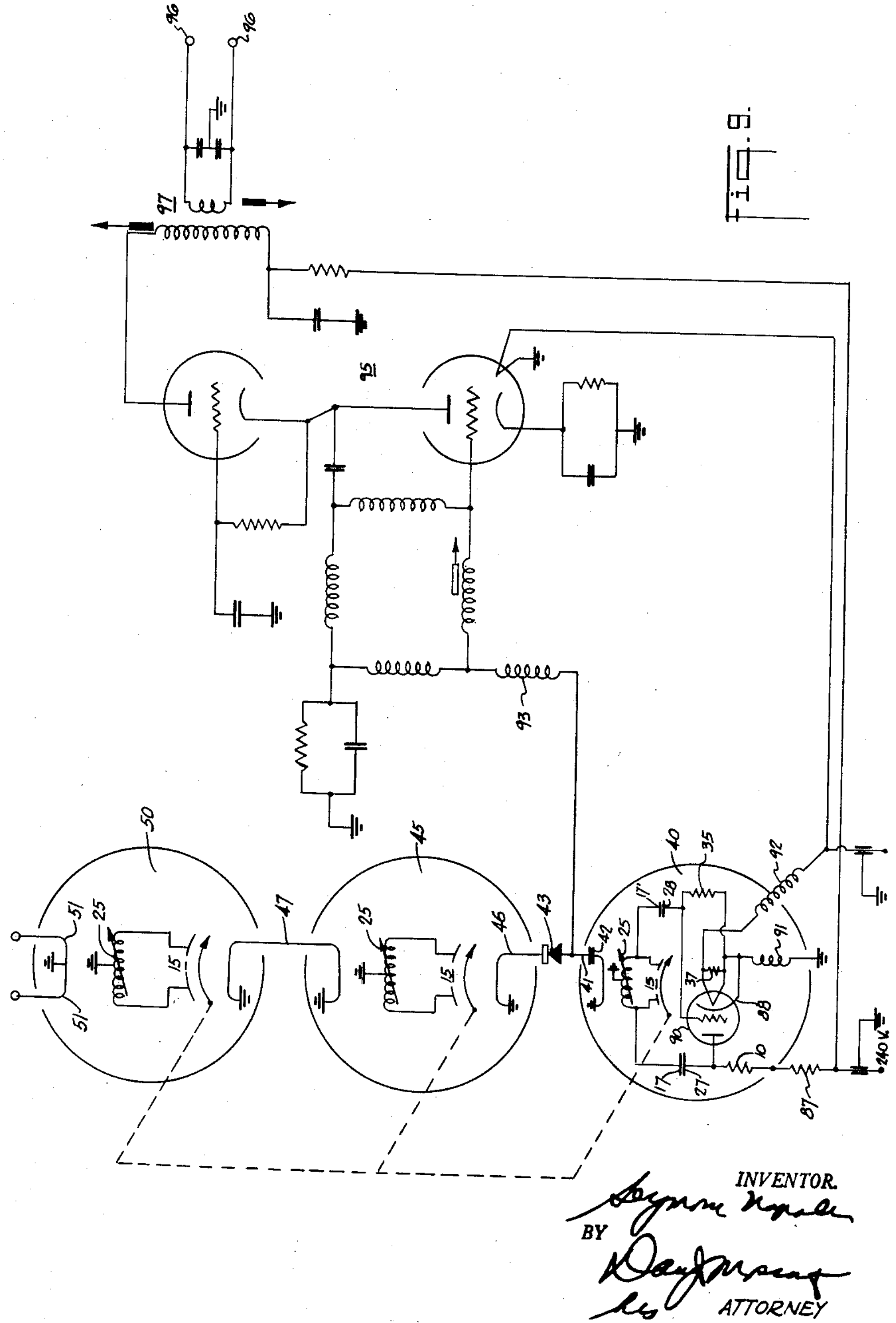

Fig. 9 is a schematic circuit diagram of the invention as incorporated in an U. H. F. converter.

Figure 1:
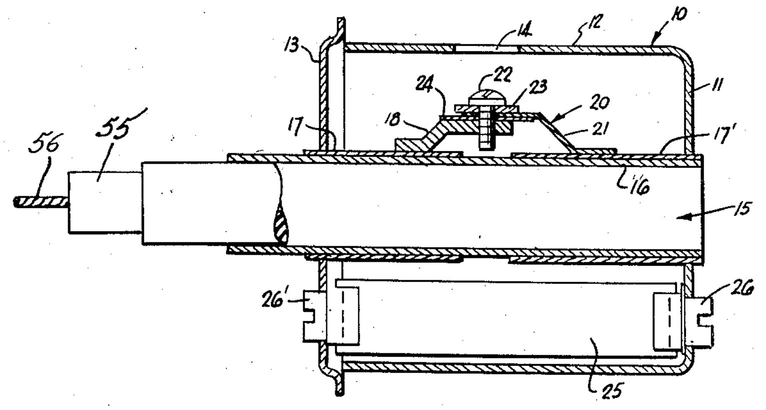
Fig. 1 is an axial sectional view through the basic coaxial cavity.

Referring to Fig. 1, the basic coaxial resonant cavity 10, of the invention, is illustrated as including a lumped center loading variable capacitance unit 15. Unit 15 comprises a low-loss-dielectric sleeve or cylinder 16 on the outer surface of which are secured metal capacitor collars or conductive metal surfaces 17, 17′. A trimming or padding condenser 20, of the compression type, interconnects collars 17 and 17′. This trimming condenser comprises an arm 18 electrically connected to sleeve or collar 17 and a resilient arm 21 electrically connected to sleeve or collar 17′. An adjusting screw 22 is inserted through an aperture in arm 21, being insulated from the latter by a dielectric washer 23. Screw 22 is threadedly engaged in arm 18, which is spaced from arm 21 by a dielectric strip 24.

Unit 15 is mounted axially of the cylindrical metal cavity 10 which includes a base 11 and a side wall 12. An annular metal cap 13 closes the open end of the cylinder and is mechanically and electrically continuous therewith. Sleeve 17 is electrically connected to cap 13 and sleeve 17′ is electrically connected to base 11, these elements thus forming, with container 10 and trimmer 20, an inductance for the tuning unit. An aperture 14 is formed in wall 12, in radial alignment with screw 22, to provide access for adjustment of the trimming capacitance.

Padding of the inductance loop is effected by a metal reed 25 which is secured, at each end, in kerfed adjustment heads 26, 26′ respectively electrically connected to base 11 and cap or head 13. By adjusting reed 25 about its longitudinal center line, a shorted inductance turn is cut into or out of the field of cavity 10 to vary the value of inductance of the tuning unit.

Figure 2:
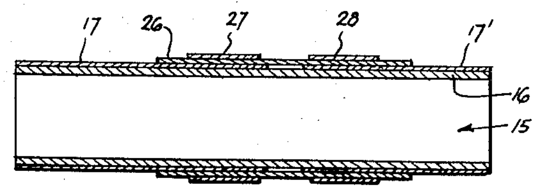
Fig. 2 is an axial sectional view through the oscillator capacitor assembly.
Figure 3:
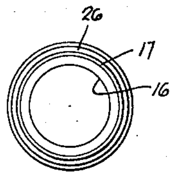
Fig. 3 is an end view of the latter.

The oscillator capacitance assembly is shown in Figs. 2 and 3 as incorporated in the basic capacitor assembly 15. To this end, a relatively short dielectric sleeve 26 is slipped over collars 17, 17′ and has cylindrical metal sleeves 27 and 28 mounted on the exterior surface thereof. Sleeve 27 forms the oscillator plate coupling collar and sleeve 28 the grid coupling collar. The oscillator plate condenser is thus formed by sleeves 17 and 27, and the grid condenser by sleeves 17′ and 28.

Figure 4:
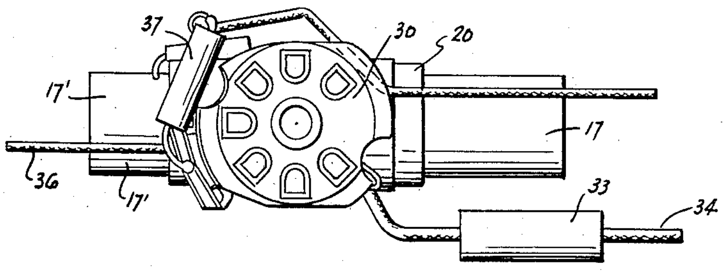
Fig. 4 is a plan view of the oscillator assembly, before insertion into its cavity container.
Figure 5:
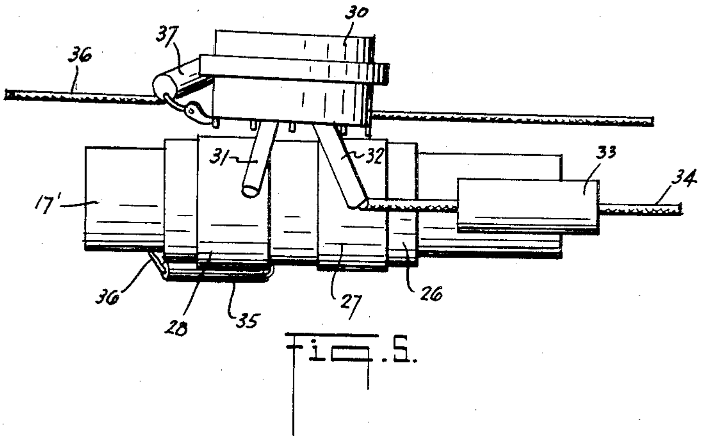
Fig. 5 is a side elevation view of the oscillator assembly.

As best seen in Figs. 4 and 5, the oscillator circuit assembly is formed by connecting a tube socket 30 and associated circuit components to the basic capacitor assembly modified as shown in Figs. 2 and 3. The plate or anode pin of socket 30 is connected to collar 28 as at 31, and the grid pin is connected to collar 27, as at 32. Also connected to collar 27 is the plate resistor 33 and its lead 34. A grid resistor 35 is connected to collar 28 and to grid lead 36, and a filament resistor 37 is connected across the filament pins of base 30. After the capacitor-tube base assembly is mechanically and electrically assembled, the assembly is placed in the capped metal resonant cavity, the side wall of the latter being formed with a tube aperture 39 radially aligned with socket 30.

Figure 6:
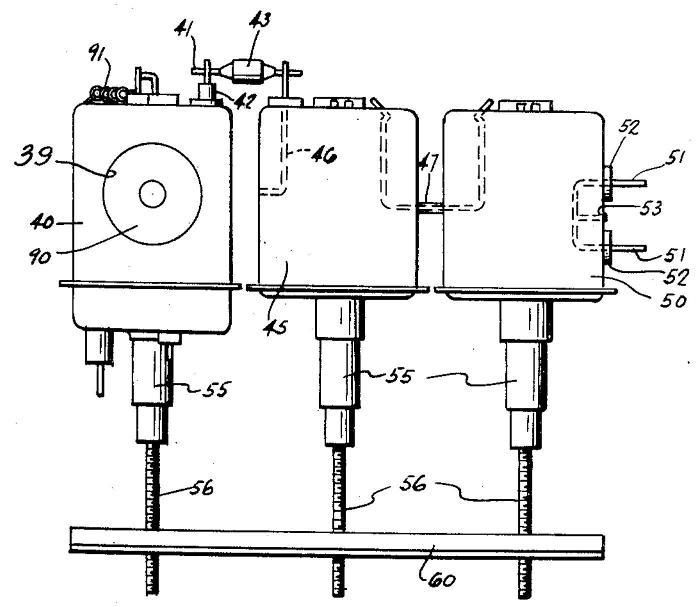
Fig. 6 is a side elevation view of the tuner assembly, comprising oscillator, mixer and antenna sections.

Referring now to Fig. 6, a tuned circuit assembly is seen as comprising a local oscillator section 40, a mixer section 45, and an antenna section 50. The capacitor unit of each section is provided with a tuning slug or plunger 55, and each slug 55 has a thin flexible threaded element 56 rotatably secured to its outer end. Elements 56 are threaded into a ganging frame 60 and provided with kerfed outer ends by means of which the elements may be threaded relative to frame 60 to adjust the initial positions of slugs 55 in the capacitor assemblies.

It should be noted that the variable capacitance units 15, incorporating the axially movable slugs or plungers 55, are essentially similar with the tuning capacitors of my copending application S. N. 247,656, filed September 21, 1951, for "Tuning Device for Signal Receivers," now Patent No. 2,667,581 issued January 26, 1954, in so far as the variable capacitor units are involved, and that therefore this application is a continuation in part of my co-pending application.

The crystal mounting clip, previously mentioned, is illustrated at 41 as extending from a small crystal coupling and first I. F. tuning capacitor 42. A crystal detector 43, which is preferably a IN72 low noise germanium diode, has one terminal secured in clip 41 and its other terminal secured in a combined crystal mounting and coupling link 46 extending into the cavity of mixer 45.

The antenna coupling link comprises two U-shape links 51, 51 passed through insulated grommets 52, 52 in the side wall of the antenna cavity. One end of each link is connected to the inside surface of the cavity side wall, as at 53, forming a balanced input of 300 ohms across the two available terminals or a 75 ohm unbalanced input when the antenna is connected to one terminal and to ground.

The coupling link between the antenna and mixer assemblies comprises a U-shape spring 47 clipped in through slots in the antenna and mixer cavities.

Figure 7:
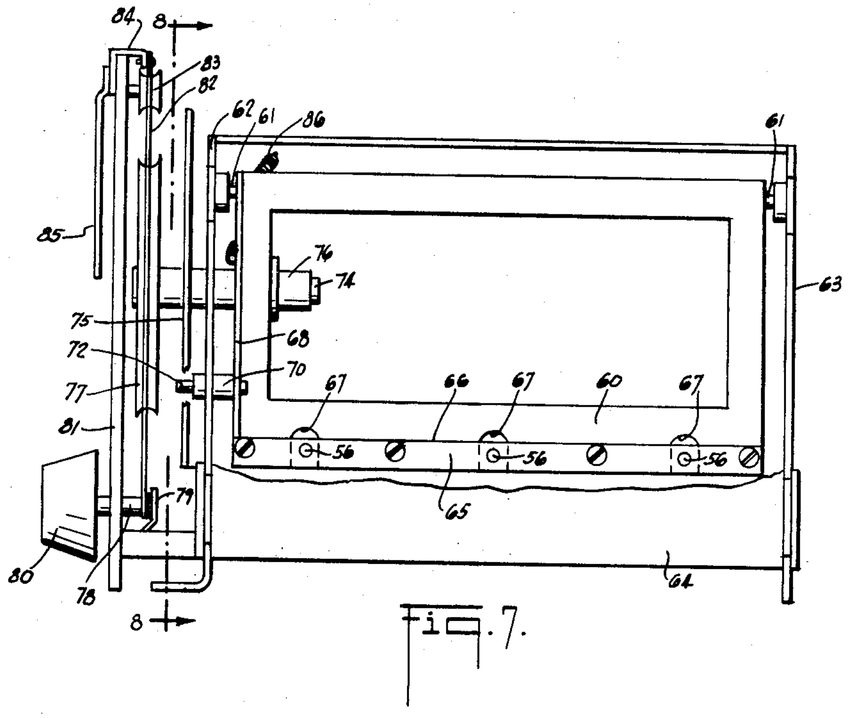
Fig. 7 is a top plan view of the driving arrangement for the ganged tuning elements.
Figure 8:
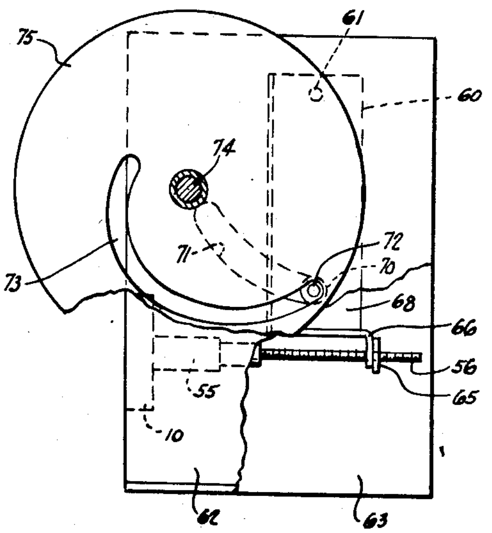
Fig. 8 is a view, partly broken away, on the line 8—8 of Fig. 7.

The station selector and ganging drive arrangement is best seen in Figs. 7 and 8. Frame 60 is generally rectangular and is pivoted or hinged on pins 61 mounted in forward chassis wall member 62 and rear member 63, these wall members being interconnected by struts 64. The free end of frame 60 has a lip or ledge 66 formed with U-shape notches 67 each aligned with a connecting member 56. Secured along ledge 66 is a dielectric strip 65 into which the members 56 are threaded.

A cam follower pin 70 on the forward end 68 of frame 60 extends through an arcuate slot 71 in wall 62 and has a reduced end 72 fitting a spiral groove 73 in a circular cam 75. This cam is secured to a shaft 74 mounted in a bearing 76 in front wall 62, and the outer end of shaft 74 has a drive pulley 77 secured thereon.

A stub shaft 78 extends through the chassis face wall 81 into a bracket 79, and has a selector knob 80 on its outer end. A flexible drive member 82, such as a cord, is given several turns around shaft 78 and is secured, intermediate its ends, to pulley 77 in the usual manner (not shown). The cord 82 is trained over pulleys 83 at the upper corners of face wall 81, and the ends of the cord are connected to an inverted channel slide 84 riding along the upper edge of wall 81. Slide 84 carries a pointer or indicator needle 85 cooperable with a dial (not shown) adjacent a window in a housing for the tuner or convertor.

When knob 80 is turned to move indicator 85 along the dial, pulley 77 is turned by cord 82. This rotates cam 75 so that cam slot 71 moves pin 70 inwardly and outwardly relative to shaft 74. This swings frame 60 about pins 61 to move slugs 55 relative to the capacitor units. A spring 86, connected between frame 60 and the chassis, biases the frame in one direction to assure positive movement of the frame by the cam drive.

Referring to the schematic circuit diagram of Fig. 9, the 240 v. plate supply is fed to plate resistor 10 through a resistor 87. The cathode 88 of the oscillator triode 90 is grounded through inductance 91, and the filament heating voltage is supplied through inductance 92. The I. F. is taken off link 41 and fed to the primary winding 93 of the I. F. input transformer. The I. F. is amplified by a cascode amplifier 95 connected between the tuner output and the antenna terminals 96 of the V. H. F. receiver. The amplifier 95 may include a 63Q7A tube, having its output anode connected to a plate transformer 97 connected to terminals 96. The oscillator triode 90 is inserted into tube socket 30 (Figs. 4 and 5) through cavity wall opening 39.

The tuner is mounted in a sub-chassis including the wall members 62, 63 and associated structural parts, and this sub-chassis is provided with a removable U-shape cover (not shown) fitting over wall members 62, 63. Thus, the tuner is completely shielded.

While a specific embodiment of the invention has been shown and described in detail to illustrate the application of the invention principles, it will be understood that the invention may be otherwise embodied without departing from such principles.

What is claimed is:

1. A local U. H. F. oscillator unit comprising, in combination, an elongated tubular dielectric member; a pair of tubular conductive metal surfaces arranged in longitudinally spaced relation on the outer surface of said member; a conductive metal plunger mounted for axial movement within said member; a cylindrical metal container enclosing said member and said surfaces and having centrally apertured end walls receiving said surfaces; each surface being fixedly metallically connected to a different end wall to form, with the container, an inductance for the unit; a second tubular dielectric member telescoped over said surfaces; a pair of metal collars mounted in longitudinally spaced relation on the external surface of said second dielectric member to form with said tubular metal surfaces, a pair of condensers; a triode tube socket mounted adjacent an opening in the side wall of said container; means connecting the plate terminal of said socket to one of said collars and the grid terminal thereof to the other collar; a triode tube mounted in said socket; an elongated strip metal reed extending between the end walls parallel to said tubular member and eccentrically of the container axis; and means mounting said reed in the end walls for rotation about its longitudinal centerline to serve as a padder for the inductance.

2. A local U. H. F. oscillator unit comprising, in combination, an elongated tubular dielectric member; a pair of tubular conductive metal surfaces arranged in longitudinally spaced relation on the outer surface of said member; a conductive metal plunger mounted for axial movement within said member; a cylindrical metal container enclosing said member and said surfaces and having centrally apertured end walls receiving said surfaces; each surface being fixedly metallically connected to a different end wall to form, with the container, an inductance for the unit; a second tubular dielectric member telescoped over said surfaces; a pair of metal collars mounted in longitudinally spaced relation on the external surface of said second dielectric member to form with said tubular metal surfaces, a pair of condensers; a triode tube socket mounted adjacent an opening in the side wall of said container; means connecting the plate terminal of said socket to one of said collars and the grid terminal thereof to the other collar; a triode tube mounted in said socket; a trimmer condenser interconnecting and fixedly supported on the inner ends of said surfaces; an elongated strip metal reed extending between the end walls parallel to said tubular member and eccentrically of the container axis; and means mounting said reed in the end walls for rotation about its longitudinal centerline to serve as a padder for the inductance.

References Cited in the file of this patent

UNITED STATES PATENTS

| | | |
|---|---|---|
| Re. 23,605 | Wallin | Dec. 23, 1952 |
| 2,085,223 | Kolster | June 29, 1937 |
| 2,125,969 | Turner | Aug. 9, 1938 |
| 2,126,868 | Brown | Aug. 16, 1938 |
| 2,153,205 | Park | Apr. 4, 1939 |
| 2,301,163 | Koch | Nov. 3, 1942 |
| 2,320,483 | Stocker | June 1, 1943 |
| 2,323,376 | Harvey | July 6, 1943 |
| 2,440,269 | Hargrove | Apr. 27, 1948 |
| 2,444,194 | Goldstine | June 29, 1948 |
| 2,477,232 | Branson | July 26, 1949 |
| 2,489,114 | Vladimir | Nov. 22, 1949 |
| 2,509,193 | Temple | May 23, 1950 |
| 2,514,425 | Thompson | July 11, 1950 |
| 2,547,637 | Gardiner et al. | Apr. 3, 1951 |
| 2,619,597 | Mlynczak | Nov. 25, 1952 |
| 2,630,488 | Clogston | Mar. 3, 1953 |
| 2,638,544 | Schreiner | May 12, 1953 |
| 2,641,708 | Carlson | June 9, 1953 |
| 2,667,581 | Auerbacher | Jan. 26, 1954 |
| 2,714,192 | Pan | July 26, 1955 |
| 2,795,693 | Fisher | June 11, 1957 |

FOREIGN PATENTS

| | | |
|---|---|---|
| 106,681 | Australia | Feb. 17, 1939 |
| 222,661 | Switzerland | Oct. 16, 1942 |
| 880,808 | France | Jan. 11, 1943 |
| 244,960 | Switzerland | June 2, 1947 |